(12) United States Patent
Mortun (10) Patent No.: US 10,148,033 B2
(45) Date of Patent: Dec. 4, 2018

(54) WATER RESISTANT ELECTRICAL DEVICES

(71) Applicant: Hubbell Incorporated, Shelton, CT (US)

(72) Inventor: Sorin I. Mortun, Irvington, NY (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/610,040

(22) Filed: May 31, 2017

(65) Prior Publication Data

US 2017/0352978 A1     Dec. 7, 2017

Related U.S. Application Data

(60) Provisional application No. 62/344,019, filed on Jun. 1, 2016.

(51) Int. Cl.
| | |
|---|---|
| *H01R 13/52* | (2006.01) |
| *H01R 13/14* | (2006.01) |
| *H02G 3/08* | (2006.01) |
| *H02G 3/18* | (2006.01) |
| *H02G 3/14* | (2006.01) |
| *H01R 24/78* | (2011.01) |
| *H01R 13/453* | (2006.01) |
| *H01R 13/74* | (2006.01) |

(52) U.S. Cl.
CPC ........... *H01R 13/521* (2013.01); *H01R 13/14* (2013.01); *H02G 3/088* (2013.01); *H02G 3/14* (2013.01); *H02G 3/18* (2013.01); *H01R 13/4534* (2013.01); *H01R 13/5213* (2013.01); *H01R 13/743* (2013.01); *H01R 24/78* (2013.01)

(58) Field of Classification Search
CPC ............ H01R 13/5219; H01R 13/5202; H01R 13/52; H01R 13/5221; H01R 13/5205; H01R 13/5208; H01R 4/2404; H01R 4/26
USPC .......................................... 439/271–275, 426
See application file for complete search history.

(56) References Cited

U.S. PATENT DOCUMENTS

| | | | |
|---|---|---|---|
| 1,557,526 A | 10/1925 | Hartmann | |
| 2,810,028 A | 10/1957 | Hopper | |
| 4,109,989 A * | 8/1978 | Snyder, Jr. ........... | G02B 6/3849 439/140 |

(Continued)

FOREIGN PATENT DOCUMENTS

CN     103236605     8/2013

OTHER PUBLICATIONS

PCT/US2017/035242 International Search Report and Written Opinion dated Aug. 24, 2017 (12 pages).

*Primary Examiner* — Gary Paumen
(74) *Attorney, Agent, or Firm* — Michael Best & Friedrich, LLP (57) ABSTRACT

An electrical outlet device includes water-resistant components to prevent the ingress of water to electrical components. One example includes a faceplate having a front surface, an outer edge extending around the front surface, and a first outlet opening extending through the front surface. A water-resistant seal is connected to the front surface of the faceplate. The seal has a first slit aligned with the first opening, a first flap adjacent the slit, and a second flap adjacent the slit. The first flap and the second flap are resiliently biased to a closed position and are moveable upon insertion of a plug.

18 Claims, 7 Drawing Sheets

(56) References Cited

U.S. PATENT DOCUMENTS

| | | | | |
|---|---|---|---|---|
| 4,293,173 | A | * | 10/1981 | Tricca .................. H01R 13/443 174/67 |
| 4,343,411 | A | | 8/1982 | Chesnut et al. |
| 4,349,241 | A | * | 9/1982 | Juris ................ H01R 13/65802 439/271 |
| 4,411,491 | A | * | 10/1983 | Larkin ................. G02B 6/3849 385/59 |
| 4,737,599 | A | | 4/1988 | Fontaine |
| 5,017,153 | A | | 5/1991 | Bowman |
| 5,280,135 | A | | 1/1994 | Berlin et al. |
| 5,342,995 | A | | 8/1994 | Comerci et al. |
| 5,382,768 | A | * | 1/1995 | Kurek ................. H01H 23/143 200/553 |
| 5,478,249 | A | | 12/1995 | Crestin |
| 5,763,831 | A | | 6/1998 | Shotey et al. |
| 5,821,484 | A | * | 10/1998 | Schulze ............. H01H 27/002 200/17 R |
| 6,095,860 | A | * | 8/2000 | Gehrke ............. H01R 13/5208 439/274 |
| 6,133,531 | A | | 10/2000 | Hayduke et al. |
| 6,222,123 | B1 | | 4/2001 | Schwarz |
| 6,250,962 | B1 | * | 6/2001 | Shinozaki .......... H01R 13/5208 439/275 |
| 6,642,453 | B2 | | 11/2003 | Shotey et al. |
| 6,770,816 | B2 | | 8/2004 | Shotey et al. |
| 6,924,433 | B2 | | 8/2005 | Shotey et al. |
| 6,987,225 | B2 | | 1/2006 | Shotey et al. |
| 7,115,828 | B2 | * | 10/2006 | McCord ............... H01H 3/3031 200/400 |
| 7,119,277 | B1 | | 10/2006 | Shotey et al. |
| 7,312,963 | B1 | | 12/2007 | Radosavljevic et al. |
| 7,323,639 | B1 | | 1/2008 | Shotey et al. |
| 8,702,439 | B1 | * | 4/2014 | Paulsel ............. H01R 13/5216 439/271 |
| 8,816,200 | B1 | | 8/2014 | Baldwin et al. |
| 2002/0139655 | A1 | | 10/2002 | Balabon et al. |
| 2005/0000719 | A1 | | 1/2005 | Shotey et al. |
| 2008/0081496 | A1 | | 4/2008 | Westhoff |
| 2008/0179071 | A1 | | 7/2008 | Jolly |
| 2008/0179072 | A1 | | 7/2008 | Drane et al. |
| 2010/0000757 | A1 | | 1/2010 | Husain et al. |
| 2014/0342589 | A1 | | 11/2014 | Lin |

\* cited by examiner

FIG. 18

WATER RESISTANT ELECTRICAL DEVICES

FIELD

Various exemplary embodiments relate to electrical devices such as wall mounted outlets and switches having water resistant components.

BACKGROUND

Conventional electrical receptacles have two-piece housings formed by separate mateable front and back covers. The covers generally mate together using any known means, such as screws, rivets, or snap-fits. A mounting bridge with ears at opposite ends generally extends between the front and back covers and allows the housing to be attached to a suitable structure, such as a building wall or an electrical box.

Certain types of outdoor electrical outlet covers provide weather resistant protection for the outlet receptacle and for an appliance to be plugged into the outdoor receptacle. For example, an electrical outlet can include a cover that sealingly encloses the outlet to prevent moisture and foreign elements from getting into the outlet and the cover. The sealing function is accomplished by various elements associated with the cover and with the outlet itself. The electrical cord extends through an opening in the cover. Because the covers extend from the receptacle, they take up significant space and can cause crowding and damage of certain plugs. The covers also require additional parts to be manufactured, packaged, and assembled by a user.

SUMMARY

According to an exemplary embodiment, an electrical outlet device includes a faceplate having a front surface, an outer edge extending around the front surface, and a first outlet opening extending through the front surface. A water-resistant seal is connected to the front surface of the faceplate. The seal has a first slit aligned with the first opening, a first flap adjacent the slit, and a second flap adjacent the slit. The first flap and the second flap are resiliently biased to a closed position and are moveable upon insertion of a plug.

According to another exemplary embodiment, an electrical outlet device includes a faceplate having a front surface, an inner surface, an outer edge extending around the front surface. The faceplate also includes a first blade opening extending through the front surface, a second blade opening extending through the front surface, and a ground opening extending through the front surface. A water-resistant first seal is connected to the inner surface of the faceplate and extending around the first plug opening. A water-resistant second seal is connected to the inner surface and extending around the second plug opening. An inner ground seal is connected to the inner surface of the faceplate and positioned over the ground opening.

According to another exemplary embodiment, an electrical outlet device includes a faceplate having a front surface, an inner surface, an outer edge extending around the front surface. The faceplate also includes a first blade opening extending through the front surface, a second blade opening extending through the front surface, and a ground opening extending through the front surface. A water-resistant seal is connected to the inner surface of the faceplate. The seal includes a first slit aligned with the first blade opening, a second slit aligned with the second blade opening, and a third slit aligned with the ground opening.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
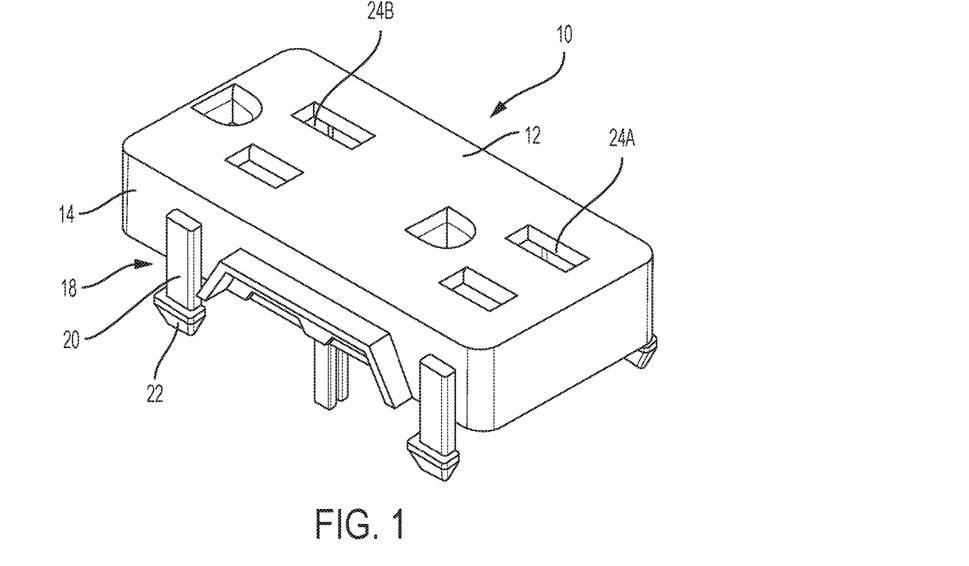
FIG. 1 is a front perspective view of an outlet faceplate.
Figure 2:
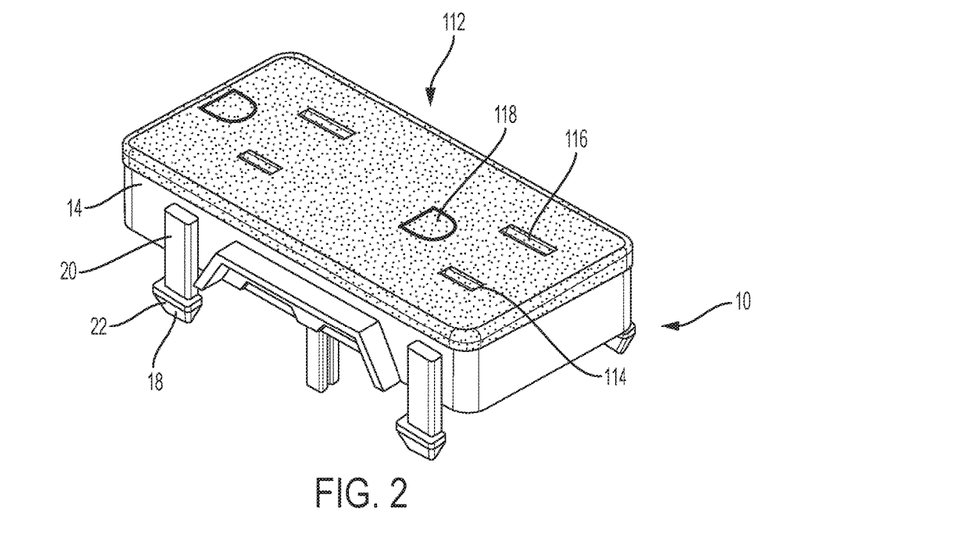
FIG. 2 is a front perspective view of an outlet faceplate and an exemplary outer seal.
Figure 3:
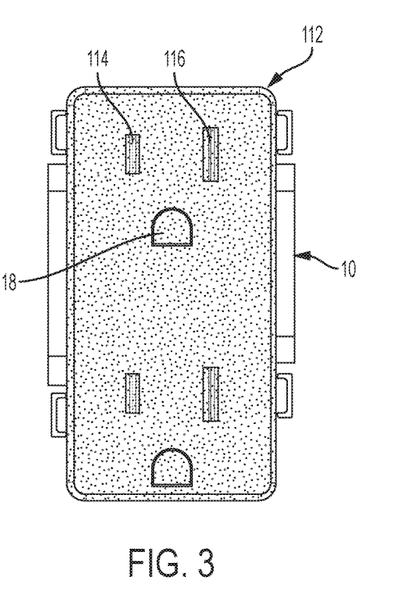
FIG. 3 is a front view of FIG. 2.

Various exemplary embodiments are related to water resistant solutions for electrical devices such as outlets and switches. FIG. 1 shows an example of a duplex outlet faceplate 10. The faceplate includes a front surface 12 and an outer edge 14 having top, bottom, and side portions. One or more attachment members or snap features 18 protrude from the outer edge 14 away from the front surface 12. In an exemplary embodiment the snap features 18 include a cantilevered arm 20 terminating in a hook member 22.

The faceplate 10 is a standard duplex type having a first set surface openings 24A and a second set of surface openings 24B for receiving two electrical plugs. The openings 24A, 24B are illustrated as standard three-prong (hot, neutral, ground) outlet openings. Various embodiments can include any number of openings for any type of electrical device, and can include any number of sets of openings. The faceplate 10 can be a variety of styles including, but not limited to, USB, flat, tamper resistant, back wired, side wired, and hospital grade.

The snap features 18 allow the faceplate 10 to be releasably connected to a base (not shown). The hook member 22 includes a substantially triangularly-shaped protrusion with a base and a tapered end. The hook member 22 is slidably inserted into a mating slot on the base to form a secure, but releasable connection. The faceplate 10 and the base form a housing containing one or more electrical contacts to electrically connect a plug or load to a power source.

Figure 4:
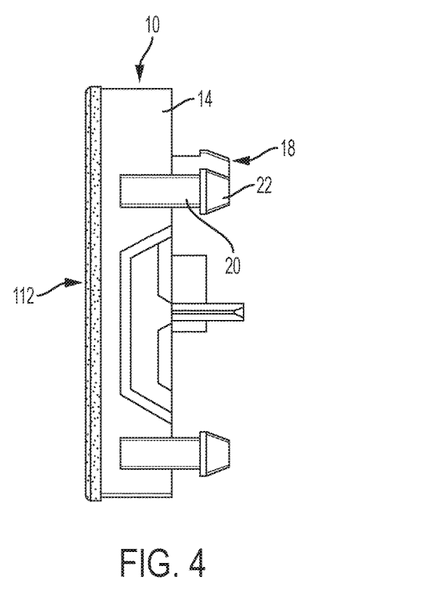
FIG. 4 is a side view of FIG. 2.
Figure 5:
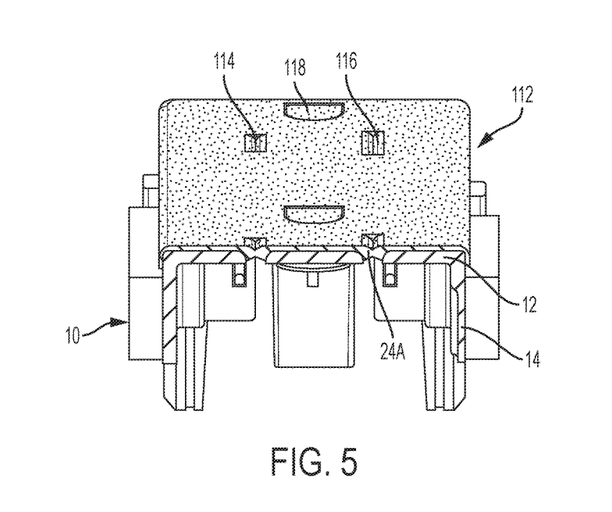
FIG. 5 is a sectional view of FIG. 2.

FIGS. 2-5 show and exemplary embodiment of a water resistant outer seal 112 for the faceplate 10. The outer seal 112 is connected to the faceplate 10. In an exemplary embodiment, the outer seal 112 is sized to cover substantially the entire front surface 12 of the faceplate 10 and to extend over the edge of the front surface 12 to cover at least a portion of the outer edge 14 (as best shown in FIGS. 4 and 5). In some embodiments, the outer seal 112 can be sized to extend just around the plug openings 24A, 24B.

The outer seal 112 includes slits corresponding to the outlet openings 24A, 24B. For example, the seal 112 can include a hot slit 114, a neutral slit 116, and a ground slit 118 with each slits having adjacent flaps. The ground slit 118 can include a first slit and a second slit intersecting the first slit forming, for example, a plus or cross intersection. In some embodiments, non-perpendicular lines can be used, for example an X-shaped crossing. The flaps adjacent the slits 114, 116, 118 can be resilient and normally biased into a closed position. Insertion of a plug will open the slits 114, 116, 118 to permit the plug blades to extend into the outlet and make electrical contact. When the plug is removed the slits 114, 116, 118 return to the closed position. The slits 114, 116, 118 can have a geometry that will allow the outer seal material to flow (move away) from the blade entry face without being overly stressed to increase the seal life expectancy. For example, the flaps can have an angled, tapering, or rounded geometry as shown in FIG. 5. The flaps surrounding the slits 114, 116, 118 can overlay the openings 24A, 24B, or can extend at least partially into the openings 24A, 24B.

The outer seal 112 can be connected to the faceplate 10 through any method that will insure proper bonding between the outer seal 112 and the front surface 12 of the faceplate 10. In an exemplary embodiment, the outer seal 112 can be molded onto the faceplate 10 for example in an overmolding or two shot molding procedure. The faceplate 10 can be initially molded and then placed into a separate mold so that the outer seal 112 can be molded onto the faceplate 10. The slits 114, 116, 118 can be formed during the molding procedure or in another operation, for example a cutting operation, either from a single direction or a dual direction (e.g. top and bottom). The slits 114, 116, 118 can be formed while the product is in the mold. The outer seal 12 can also be connected in other ways, for example through adhesives or ultrasonic welding.

The size, shape, and configuration of the outer seal 112 can be adjusted based on the outlet. For example the outer seal 112 can be modified to work with different types and sizes of outlets including, but not limited to, type A through type O outlets as designated by the International Trade Association, multiphase outlets, and industrial pin and sleeve type outlets. The outer seal 112 can be made from any suitable resilient material, including materials that contain polymers and/or elastomers.

One or more seals can also be placed on the inside of the faceplate 10. FIGS. 6-11 show exemplary embodiments of inner seals, for example a first set of blade inner seals 212, a second set of blade inner seals 214, and inner ground seal 216. The first set of blade inner seals 212 is wider than the second set of blade inner seals 214. The inner seals 212, 214, 216 include openings (as shown with the first and second blade inner seals 212, 214) or slits 218 (as show with the inner ground seal 216). The size, shape, and configuration of the inner seals 212, 214 can be altered from what is shown.

Figures 6, 7, 8:
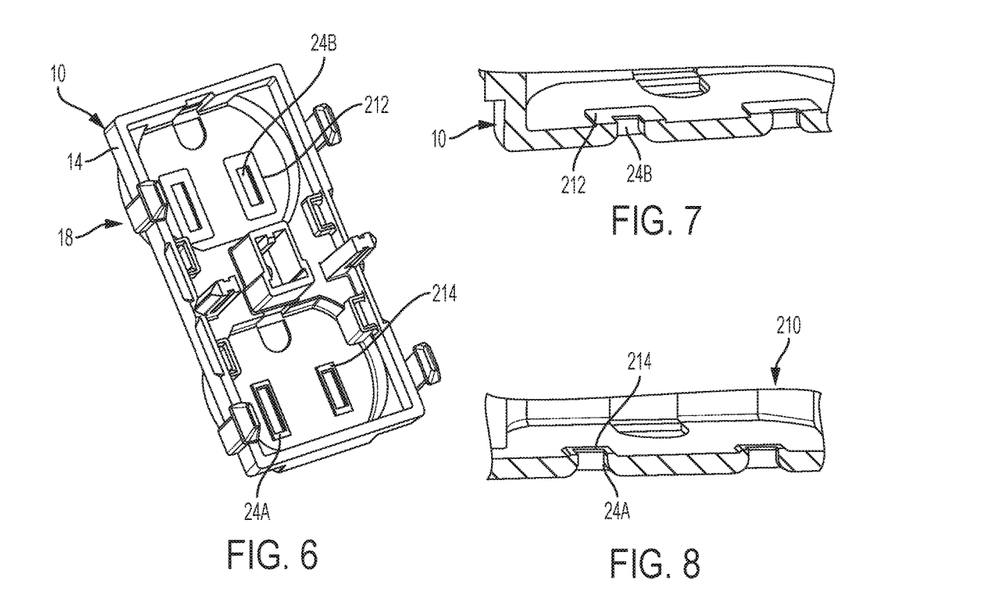
FIG. 6 is a rear perspective view of an outlet faceplate and a first and second exemplary inner seal.
FIG. 7 is a sectional view of FIG. 6 and the first exemplary inner seal.
FIG. 8 is a sectional view of FIG. 6 and the second exemplary inner seal.

FIG. 6 shows the first set of inner seals 212 used with the second set of outlet openings 24B and the second set of inner seals 214 used with the first set of openings 24A. In some embodiments, only the first set of blade inner seals 212 or the second set of blade inner seals 214 are used with both openings 24A, 24B.

Figure 9A:
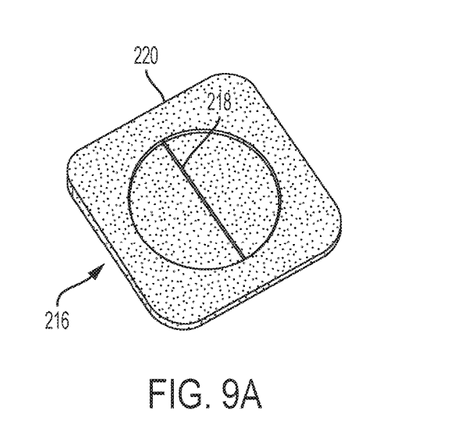
FIG. 9A is a front perspective view of an exemplary ground seal.
Figure 9B:
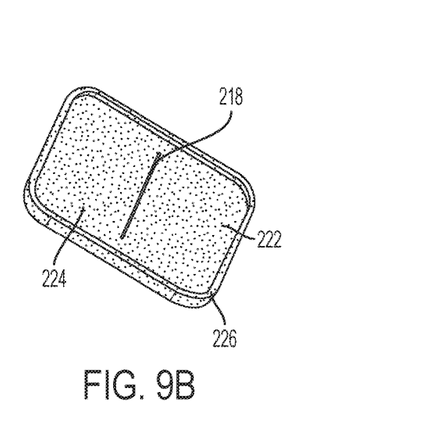
FIG. 9B is a rear perspective view of FIG. 9A.

FIGS. 9A and 9B show an exemplary embodiment of the inner ground seal 216 that includes a front portion 220 and a rear portion 222. The front portion 220 has a substantially planar outer surface. The rear portion 222 includes a recessed portion 224 surrounded by an outer rim 226.

Figure 10:
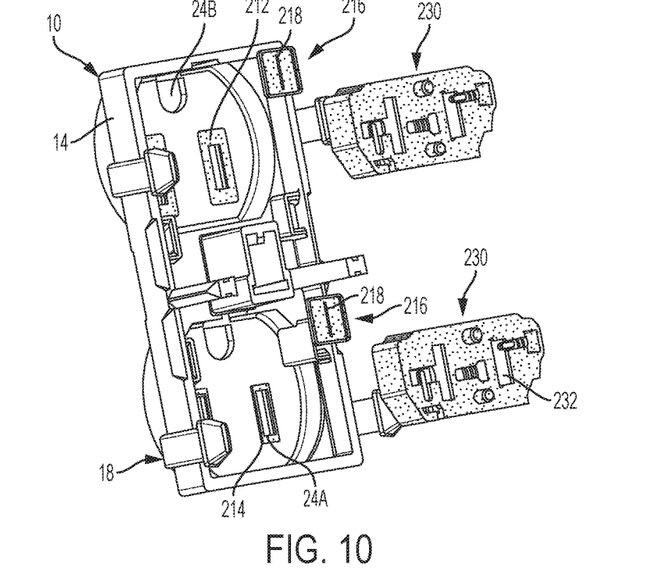
FIG. 10 is an exploded view of the outlet face plate and seals of FIG. 6 and a tamper resistant mechanism.
Figure 11:
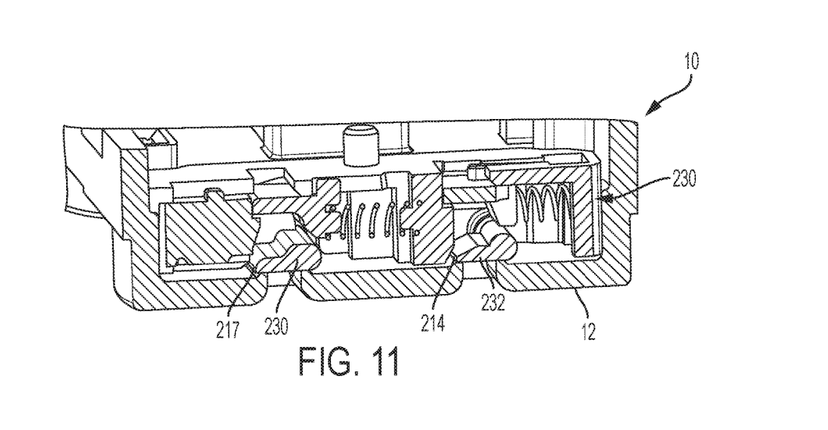
FIG. 11 is a sectional view of the faceplate and the tamper resistant mechanism.

In an exemplary embodiment, the blade inner seals 212, 214 and the inner ground seal 216 can be used in conjunction with an outlet having a tamper resistant mechanism 230 as shown in FIGS. 10 and 11. The tamper resistant mechanism 230 includes shutters 232 that are moveably positioned behind the faceplate 10. The blade inner seals 212, 214 are positioned on the rear surface of the faceplate 10 and extend at least partially around and at least partially into the hot and neutral outlet openings and the inner ground 216 is positioned over the ground opening. The blade inner seals 212, 214 engage the shutters 232 to help prevent water from entering the outlet. When a plug is inserted, the shutters 232 move to allow the blades to make an electrical connection with the outlet. The ground seal slits 218 can be resilient and normally biased into a closed position. The slits 218 open during the insertion of a ground prong.

The inner seals 212, 214, 216 can be connected to the faceplate 10 through any method that will insure proper bonding. In an exemplary embodiment, the inner seals 212, 214, 216 can be molded onto the faceplate 10 for example in an overmolding or two shot molding procedure. The slits 218 can be formed during the molding procedure or in another operation, for example a cutting operation, either from a single direction or a dual direction (e.g. top and bottom). The slits 218 can be formed while the product is in the mold. The inner seals 212, 214, 216 can also be connected in other ways, for example through adhesives or ultrasonic welding.

The size, shape, and configuration of the inner seals 212, 214, 216 can be adjusted based on the outlet. For example the inner seals 212, 214, 216 can be modified to work with different types and sizes of outlets discussed previously. The inner seals 212, 214, 216 can be made from any suitable resilient material, including materials that contain polymers and/or elastomers.

Figure 12:
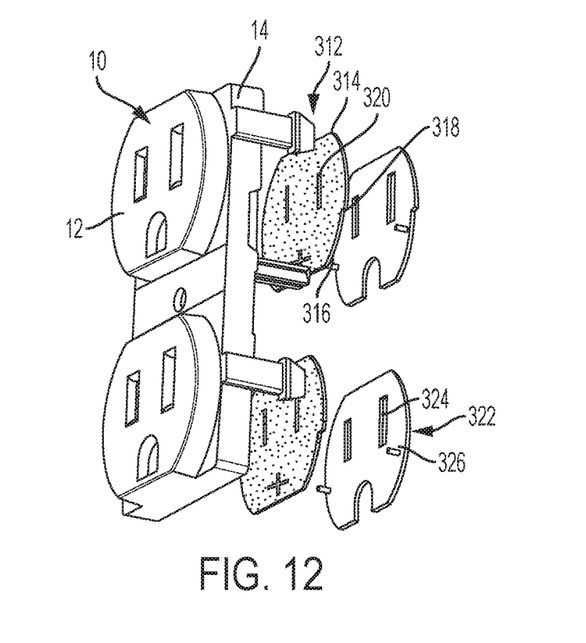
FIG. 12 is an exploded view of an outlet faceplate, an exemplary inner seal, and a seal cover.
Figure 13:
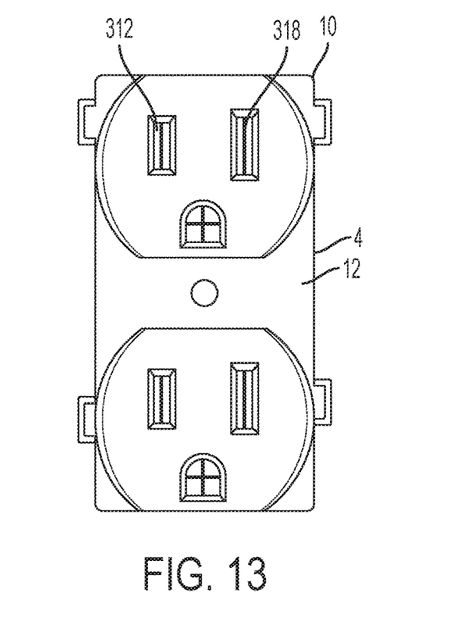
FIG. 13 is a front view of FIG. 12.

FIGS. 12 and 13 show another exemplary embodiment of an inner seal 312. A first inner seal 312 is positioned on the interior of the faceplate 10 behind the first set of plug openings 24A and a second inner seal 312 is positioned on the interior of the faceplate 10 behind the second set of plug openings 24B. The inner seal 312 has a size substantially corresponding to each outlet area. As best shown in FIG. 12, the inner seal 312 includes an upper portion 314 and a lower portion 316. The upper portion 314 is wider than the lower portion 316 forming a shoulder 318.

The inner seal 312A, 312B includes slits 320 corresponding to the outlet openings 24A, 24B. For example, the inner seal 312A can include a hot slit, a neutral slit, and a ground slit similar to those shown in FIG. 1. The slits 320 are resilient, and normally biased into a closed position but open as a plug is inserted.

In an exemplary embodiment, a seal cover 322 can be positioned over the inner seal 312. The seal cover includes 322 a set of plug openings 324. A pair of protrusions 324 extend from the front surface of the seal cover 322. The protrusions can be used to align and connect the seal cover 322 to the faceplate 10. As a plug is inserted and the slits 318 are moved or deformed, the seal cover 322 prevents the slits from becoming entangled in a tamper resistant mechanism.

The inner seal 312 can be connected to the faceplate 10 through any method that will insure proper bonding. In an exemplary embodiment, the inner seal 312 can be molded onto the faceplate 10 for example in an overmolding or two shot molding procedure. The slits 318 can be formed during the molding procedure or in another operation, for example a cutting operation, either from a single direction or a dual direction (e.g. top and bottom). The slits 318 can be formed while the product is in the mold. The inner seal 312 can also be connected in other ways, for example through adhesives or ultrasonic welding.

The size, shape, and configuration of the inner seal 312 can be adjusted based on the outlet. For example the inner seal 312 can be modified to work with different types and sizes of outlets discussed previously. The inner seals 312 can be made from any suitable resilient material, including materials that contain polymers and/or elastomers.

Figure 14:
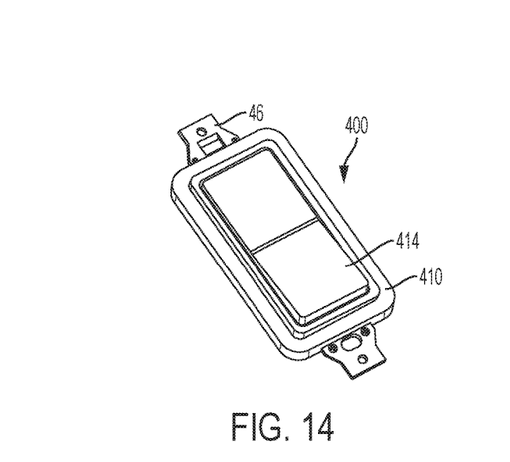
FIG. 14 is front perspective view of a switch.
Figure 15:
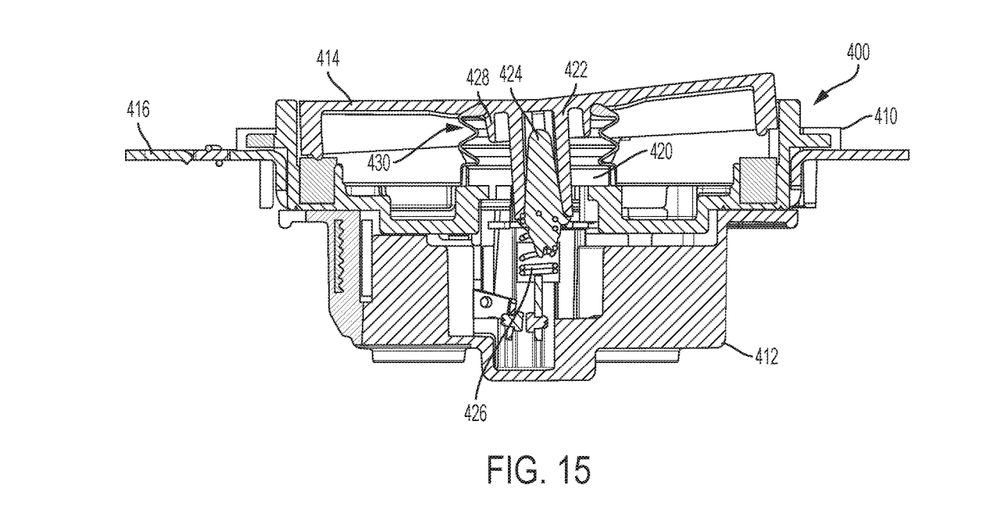
FIG. 15 is a sectional view of FIG. 14.
Figure 16:
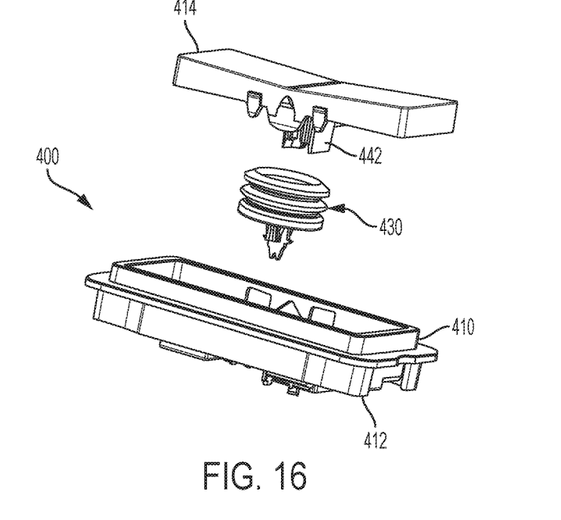
FIG. 16 is an exploded view of FIG. 14.

FIGS. 14-16 show an exemplary embodiment of a switch assembly 400. The switch 400 is a constructed for mounting in a standard electrical box for supplying and controlling power to an outlet or external load such as a light fixture, ceiling fan or the like. The switch 400 includes a housing having a faceplate 410 and a base 412. An actuator 414 is moveably connected to the faceplate 410. A mounting strap 416 is connected to the housing, for example between the faceplate 410 and the base 412. The housing contains electrical contacts and additional mechanical and electrical components as would be understood by one of ordinary skill in the art. A central opening is provided in the faceplate 410 surrounded by a first rim 420. The central opening provides communication between the actuator 414 and an inner cavity in the base 412.

The actuator 414 includes a rocker 422 that pivots about a brush arm 424 between an on position and an off position. The brush arm 424 extends from the internal cavity of the base 412 through the central opening and is at least partially supported by a biasing member 426. A second rim 428 extends from the actuator 414 toward the internal cavity around the rocker 422. One or more electrical components are positioned in the internal cavity. The actuator 414 is shown and described herein as a rocker switch although other forms of actuators 414 can be used.

Figure 17:
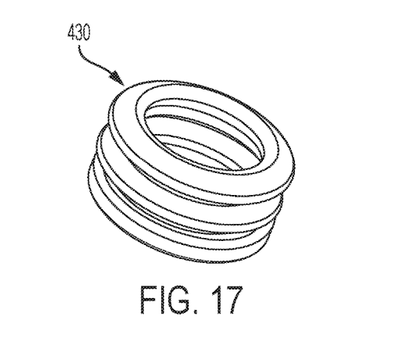
FIG. 17 is a perspective view of an exemplary used in the switch of FIG. 14.
Figure 18:
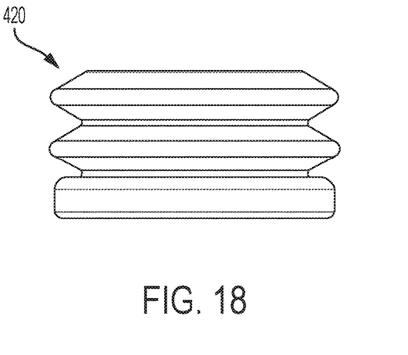
FIG. 18 is a side view of FIG. 17.

According to an exemplary embodiment a seal 430 is positioned inside the housing, for example around the rocker 422. The seal 430 can be a bellows type seal having a substantially cylindrical cross section and one or more corrugations. The brush arm 424 and can be compressed or moved as the actuator 56 is pivoted. The seal 430 can help prevent water from entering through the front face of the device and damaging the internal components. The seal 430 can be seated against the first and second rims 420, 428.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. An electrical outlet device comprising:
   a faceplate having a front surface, an outer edge extending around the front surface, and a first outlet opening extending through the front surface; and
   a water-resistant seal molded to the front surface of the faceplate, the seal having a first slit aligned with the first opening, a first flap adjacent the first slit, and a second flap adjacent the first slit,
   wherein the first flap and the second flap are resiliently biased to a closed position and are moveable upon insertion of a plug, and wherein the first flap and the second flap have a tapered geometry.

2. The electrical outlet device of claim 1, wherein the seal is overmolded to the outer surface of the faceplate.

3. The electrical outlet device of claim 1, wherein the faceplate includes a second opening and a ground opening and the seal includes a second slit aligned with the second opening and a first ground slit aligned with the ground opening.

4. The electrical outlet device of claim 3, wherein the seal includes a second ground slit perpendicular to the first ground slit.

5. The electrical outlet device of claim 1, wherein the first flap and the second flap extend at least partially into the first opening.

6. The electrical outlet device of claim 1, wherein the seal covers the entire front surface.

7. The electrical outlet device of claim 6, wherein the seal extends at least partially over the outer edge.

8. An electrical outlet device comprising:
   a faceplate having a front surface, an inner surface, an outer edge extending around the front surface, and a first blade opening extending through the front surface, a second blade opening extending through the front surface, and a ground opening extending through the front surface;
   a water-resistant first seal connected to the inner surface of the faceplate and extending around the first plug opening;
   a water-resistant second seal connected to the inner surface and extending around the second plug opening; and
   an inner ground seal connected to the inner surface of the faceplate and positioned over the ground opening.

9. The electrical outlet device of claim 8, further comprising a tamper resistant mechanism having a first shutter configured to engage the first seal and a second shutter configured to engage the second seal.

10. The electrical outlet device of claim 8, wherein the ground seal includes a slit and flaps resiliently biased to a closed position.

11. The electrical outlet device of claim 10, wherein the ground seal includes a recessed portion surrounded by an outer rim.

12. The electrical outlet device of claim 8, wherein the first seal extends at least partially into the first opening and the second seal extends at least partially into the second opening.

13. An electrical outlet device comprising:
   a faceplate having a front surface, an inner surface, an outer edge extending around the front surface, and a first blade opening extending through the front surface, a second blade opening extending through the front surface, and a ground opening extending through the front surface; and
   a water-resistant seal connected to the inner surface of the faceplate and having a first slit aligned with the first blade opening, a second slit aligned with the second blade opening, and a third slit aligned with the ground opening.

14. The electrical outlet device of claim 13, wherein the seal includes an upper portion having a first width and the seal includes a lower portion having a second width that is less than the first width.

15. The electrical outlet device of claim 14, wherein a shoulder is formed at the intersection of the first width and the second width.

16. The electrical outlet device of claim 13, wherein the seal has a sized configured to extend around the first and second blade openings and the ground opening.

17. The electrical outlet device of claim 13, further comprising a seal cover positioned over the seal opposite from the inner surface.

18. The electrical outlet device of claim 17, wherein the seal cover includes a first projection and a second projection for connecting the seal cover to the faceplate.

* * * * *